(12) United States Patent
Ohta et al.

(10) Patent No.: US 8,646,652 B2
(45) Date of Patent: Feb. 11, 2014

(54) CARD EXTRACTING DEVICE AND CONTROL METHOD FOR CARD EXTRACTING DEVICE

(75) Inventors: Keiji Ohta, Nagano (JP); Yasuhiro Kitazawa, Nagano (JP)

(73) Assignee: Nidec Sankyo Corporation (JP)

( * ) Notice: Subject to any disclaimer, the term of this patent is extended or adjusted under 35 U.S.C. 154(b) by 381 days.

(21) Appl. No.: 12/909,334

(22) Filed: Oct. 21, 2010

(65) Prior Publication Data

US 2011/0095041 A1    Apr. 28, 2011

(30) Foreign Application Priority Data

Oct. 23, 2009 (JP) ................................. 2009-244020

(51) Int. Cl.
*B65H 3/00* (2006.01)
*G07F 11/16* (2006.01)
*B65H 3/52* (2006.01)

(52) U.S. Cl.
USPC ........... 221/258; 221/210; 221/259; 221/226; 221/232; 221/248; 221/230; 221/277; 221/213; 221/217; 221/197; 271/138; 271/35; 271/131; 235/475

(58) Field of Classification Search
CPC ............. B65H 3/00; B65H 3/52; G07F 11/16
USPC ......... 221/258, 197, 210, 259, 226, 232, 248, 221/230, 277, 213, 217; 271/138, 35, 131; 235/475
See application file for complete search history.

(56) References Cited

U.S. PATENT DOCUMENTS

| | | | | |
|---|---|---|---|---|
| 3,850,299 A | * | 11/1974 | Kreitzer | 209/569 |
| 4,008,889 A | * | 2/1977 | Ayres | 271/99 |
| 5,238,143 A | * | 8/1993 | Crighton | 221/7 |
| 5,383,569 A | * | 1/1995 | Muto | 221/203 |
| 5,542,571 A | * | 8/1996 | Belka | 221/268 |
| 5,647,507 A | * | 7/1997 | Kasper | 221/151 |
| 5,829,631 A | * | 11/1998 | Kasper | 221/198 |
| 5,833,104 A | * | 11/1998 | Horniak et al. | 225/106 |
| 5,842,598 A | * | 12/1998 | Tsuchida | 221/258 |
| 5,857,588 A | * | 1/1999 | Kasper | 221/274 |
| 5,934,662 A | * | 8/1999 | Acquaviva | 271/18.1 |
| 5,941,414 A | * | 8/1999 | Kasper | 221/210 |

(Continued)

FOREIGN PATENT DOCUMENTS

| | | | |
|---|---|---|---|
| JP | 2008-276484 A | | 11/2008 |
| JP | 2008276484 | * | 11/2008 |
| JP | 2011088719 | * | 5/2011 |

*Primary Examiner* — Gene O. Crawford
*Assistant Examiner* — Rakesh Kumar
(74) *Attorney, Agent, or Firm* — Cantor Colburn LLP

(57) ABSTRACT

A card extracting device for use with a plurality of cards may include a card storage, a gate through which the cards pass toward an outside of the card storage, an extracting tab to engage with and extract one of the cards, a tab-moving mechanism to move the extracting tab, an extracting roller outside the card storage to further forward the extracted card, a motor to drive the tab-moving mechanism and the extracting roller, a card-extraction detecting section to detect that card extraction is completed, and a control section to control the motor. An engaging section may be formed in the extracting tab to abut a rear end portion of the card and extract the card. The control section may drive the motor forward to extract the card or drive the motor in reverse based on a detection result from the card extraction detecting section.

2 Claims, 9 Drawing Sheets

(56) References Cited

U.S. PATENT DOCUMENTS

| | | | |
|---|---|---|---|
| 6,029,971 A * | 2/2000 | Lynch et al. | 271/34 |
| 6,036,052 A * | 3/2000 | Tong | 221/259 |
| 6,050,448 A * | 4/2000 | Willis | 221/197 |
| 6,098,840 A * | 8/2000 | Ito et al. | 221/232 |
| 6,126,036 A * | 10/2000 | d'Alayer de Costemore d'Arc et al. | 221/253 |
| 6,155,556 A * | 12/2000 | Lynch et al. | 271/117 |
| 6,231,042 B1 * | 5/2001 | Ito et al. | 271/157 |
| 6,267,370 B1 * | 7/2001 | Ito et al. | 271/138 |
| 7,083,088 B2 * | 8/2006 | Yamamiya | 235/381 |
| 7,775,441 B2 * | 8/2010 | Tatai et al. | 235/475 |
| 7,980,420 B2 * | 7/2011 | Yamamiya | 221/268 |
| 2012/0109373 A1 * | 5/2012 | Shiomi et al. | 700/242 |

* cited by examiner

CARD EXTRACTING DEVICE AND CONTROL METHOD FOR CARD EXTRACTING DEVICE

CROSS REFERENCE TO RELATED APPLICATIONS

The present application claims priority under 35 U.S.C. §119 to Japanese Application No. 2009-244020 filed Oct. 23, 2009, the entire content of which is incorporated herein by reference.

FIELD OF TECHNOLOGY

The present invention relates to a card extracting device for extracting cards in a predetermined direction and to a control method for the card extracting device.

BACKGROUND

The present applicant has proposed a card issuing device equipped with a card storage in which a plurality of cards are stacked up, a card processing section into which the cards extracted from the card storage are transported and in which magnetic information recorded on the cards is read, and a card extracting mechanism which extracts the cards stored in the card storage toward the card processing section (see Patent Reference 1, for example).

In the card issuing device disclosed in Patent reference 1, the card extracting mechanism is equipped with a card-transporting mechanism arranged on the bottom face side of the card storage, an extracting roller arranged outside the card storage, a pad roller urged toward the extracting roller, a motor which drives the card-transporting mechanism and the extracting roller, and a transmitting mechanism which transmits the driving force of the motor to the card-transporting mechanism and the extracting roller.

The card-transporting mechanism is equipped with an extracting tab which engages with the rear edge of a card at the bottom among a plurality of the cards stored in the card storage to extract the cards one by one, a chain to which the extracting tab is fixed, and a pair of sprockets over which the chain is looped. The transmitting mechanism is equipped with a driven pulley which is fixed to the rotation shaft of one of a pair of the above-described sprockets to transmit the driving force to the sprocket, another driven pulley which is fixed to the rotation shaft of the extracting roller to transmit the driving force to the extracting roller, a driving pulley fixed to the output shaft of the motor and a belt looped around these driven pulleys and driving pulley. In this card extracting device, the diameter of the driven pulley which transmits the power to the extracting roller is smaller than the diameter of the driven pulley which transmits the power to the sprockets so that the card-transporting speed of the extracting roller is faster than the card-transporting speed of the extracting tab.

In this card issuing device, when the extracting tab positioned in a predetermined stand-by position moves along the rotation of the motor, a card at the bottom in the card storage is extracted by the extracting tab. When the front end of the card extracted from the card storage by the extracting tab reaches the extracting roller, this card is further forwarded to the card processing section by the extracting roller and the pad roller. When the rear edge of the card escapes between the extracting roller and the pad roller, part of the card is exposed at the card discharge opening; then, the extraction of the card by the card extracting mechanism is completed. When the extraction of the card is completed, the card issuing device is tuned into a state waiting for a user to grasp the front end side of the card and pull it out from the card issuing device.

PATENT REFERENCE

[Patent Reference 1] Japanese Unexamined Patent Application Tokkai 2008-276484

At a card issuing device equipped with the components disclosed in the patent reference 1, somebody may block the card discharge opening for a practical joke or a card may slip between the extracting roller and the pad roller and become stuck inside the device (card jam). Also, a user may push the card which is waiting to be pulled out back into the device. In this case, the jammed card or the card pushed back into the device needs to be re-extracted by the card extracting mechanism.

In the card issuing device disclosed in Patent reference 1, the extracting tab and the extracting roller are driven by a common motor. Therefore, when the extracting roller and the pad roller re-extract the jammed card or the card pushed back into the device, there is a risk in this card issuing device that the extracting tab may pass the stand-by position, abut on the next card stored at the bottom in the card storage and extract this card. Therefore, once a card jam occurs or the card waiting to be pulled out is pushed back into this card issuing device, it will be difficult for the device to re-extract this card automatically.

Therefore, at least an embodiment of the present invention may provide a card extracting device which can automatically re-extract the card pushed back into the device while waiting to be pulled out or the card jammed inside the device without extracting a card stored in the card storage. Also, at least an embodiment of the present invention may provide a control method for a card extracting device which can automatically re-extract the card pushed back into the device while waiting to be pulled out or the card jammed inside the device without extracting a card stored in the card storage.

SUMMARY

To achieve the above, at least an embodiment of a card extracting device may include a card storage in which a plurality of cards are stacked up, a gate through which the cards stored in the card storage pass toward the outside of the card storage, an extracting tab that engages with the cards stored in the card storage to extract them one by one, a tab-moving mechanism which moves the extracting tab, an extracting roller arranged outside the card storage to further extract the card which has been extracted by the extracting tab, a motor which drives the tab-moving mechanism and the extracting roller together, a card extraction-detecting means which detects the completion of the card extraction, and a control means to control the motor; wherein an engaging section is formed in the extracting tab to abut on the rear end portion of the card in the card extracting direction to extract the card, and the control means which drives the motor forward to extract the card from the card storage and, based on the detection result of the card extraction-detecting means, drives the motor in reverse to move the extracting tab in the opposite direction from the card extracting direction.

Also, to achieve the above, in a control method for a card extracting device equipped with a card storage in which a plurality of cards are stacked up, a gate through which the cards stored in the card storage pass toward the outside of the card storage, an extracting tab that engages with the cards stored in the card storage to extract them one by one, a tab-moving mechanism which moves the extracting tab, an extracting roller arranged outside the card storage to further extract the card which has been extracted by the extracting tab, a motor which drives the tab-moving mechanism and the extracting roller together, a card extraction-detecting means which detects the completion of the card extraction, and a control means for controlling the motor, a control method for the card extracting device may include a card extracting step which drives the motor forward to extract the card to the outside of the card storage, an extracting tab-reversing step which drives the motor in reverse, based on the detection result of the card extraction-detecting means, to move the extracting tab in the opposite direction from the card extracting direction, and a card re-extracting step which drives the motor forward to re-extract the card after the extracting tab-reversing step.

In at least an embodiment of the card extracting device, the control means to control the motor, which drives the tab-moving mechanism to move the extracting tab and the extracting roller, drives the motor in reverse, based on the detection result of the card extraction-detecting means which detects the completion of the card extraction to move the extracting tab in the opposite direction from the card extracting direction. Also, at least an embodiment of the control method for the card extracting device drives the motor in reverse in the extracting tab-moving-in reverse step based on the detection result of the card extraction-detecting means, to move the extracting tab in the opposite direction from the card extracting direction. Also, the motor is driven forward to re-extract the card in the card re-extracting step after the extracting tab-reversing step.

Therefore, when the card extraction-detecting means detects that a card jam has occurred or the card waiting to be pulled out is pushed back into the device, the extracting tab is first moved in the direction opposite from the card extracting direction and then the jammed card or the card pushed back into the device can be re-extracted. Thus, even when the extracting tab and the extracting roller are driven by a common motor, [the device] can prevent the extracting tab from passing the standby position and making contact with a card stored in the card storage when the extracting roller re-extract the jammed card or the card pushed back into the device. Consequently, the card pushed back into the device while waiting to be pulled out or the jammed card can be automatically re-extracted without extracting a card stored in the card storage.

The card extracting device may be equipped with a card transporting-preventing means which prevents the extracting roller from transporting the card when the motor is driven in reverse. Having the device configured in this way, even when the motor is driven in reverse, the device can prevent the card pushed back into the device while waiting to be pulled out or the jammed card from being transported back into the card storage.

The card transporting-preventing means may be a one-way clutch which transmits the driving force of the motor to the extracting roller when the motor is driven forward and interrupts transmission of the driving force of the motor to the extracting roller when the motor is driven in reverse. Having the device configured in this way, the device can prevent the card pushed back into the device while waiting to be pulled out or the jammed card from being transported back into the card storage.

The control means may drive the motor in reverse until the extracting tab comes to the position at which the engaging section does not abut on the rear end portion of a card when the motor is driven in reverse. Also, the motor may be driven in reverse in the extracting tab-reversing step until the extracting tab comes to the position at which the extracting tab does not abut on the rear end portion in the extracting direction of a card stored in the card storage. Having the device configured in this way, even when the motor is driven in reverse to move the extracting tab in the direction opposite from the card extracting direction, the extracting tab is prevented from extracting a card stored in the card storage when the jammed card or the card pushed back into the device is re-extracted by the extracting roller.

The card extracting device may be equipped with an extracting tab-detecting means which detects the position of the extracting tab, and the control means drive the motor in reverse, based on a predetermined reference position of the extracting tab at which the extracting tab is detected by the extracting tab-detecting means, until the extracting tab comes to the position at which the engaging section does not abut on the rear end portion of a card stored in the card storage. Having the device configured in this way, the amount of counterclockwise rotation of the motor can be determined based on the predetermined reference position of the extracting tab; therefore, the motor can be driven in reverse more precisely until the extracting tab comes to the position at which the engaging section thereof does not abut on the rear end portion of a card stored in the card storage.

The card extracting device may be equipped with a standby position-detecting means which detects that the extracting tab is in a predetermined standby position at which the extracting tab stands by prior to card extraction, and the control means drive the motor in reverse to move the extracting tab in the opposite direction from the card extracting direction, based on the detection result of the card extraction-detecting means and when the standby position-detecting means detects that the extracting tab is in the standby position. Also, the card extracting device may be equipped with a standby position-detecting means to detect that the extracting tab prior to the card extraction is in the predetermined standby position at which the extracting tab stands by prior to card extraction, and the extracting tab-moving-in-reverse step be carried out based on the detecting result of the card extraction-detecting means and when the standby position detecting means detects that the extracting tab is in the standby position. If the extracting tab hasn't reached the standby position after extracting the card, there is only a low possibility that, when the jammed card or the card pushed back into the device is re-extracted by the extracting roller, the extracting tab passes the stand-by position and abuts on a card stored in the card storage. Having the device configured in the above manner, the motor is continually driven forward without moving the extracting tab in the opposite direction from the card extracting direction until the extracting tab reaches the standby position in order to re-extract the jammed card or the card pushed back into the device. Therefore, the card discharging process can be quickened when a card jam occurs or the card waiting to be pulled out is pushed back into the device.

The card extracting device may be equipped with a card discharging section at which a card discharge opening is formed so that the card extracted by the extracting roller is discharged from there. In this case, it is preferred that the card extracting device be equipped with a card discharge detecting means for detecting that the card is discharged from the card discharge opening. Having the device configured in this way, the status of the card extracted by the extracting roller can be properly judged by using the card discharge detecting means.

As described above, at least an embodiment of the card extracting device enables that the card pushed back into the device while waiting to be pulled out or the jammed card be automatically re-extracted without extracting a card stored in the card-storing section.

BRIEF DESCRIPTION OF DRAWING

Embodiments will now be described, by way of example only, with reference to the accompanying drawings which are meant to be exemplary, not limiting, and wherein like elements are numbered alike in several Figures, in which.

DETAILED DESCRIPTION OF PREFERRED EMBODIMENTS

Figure 1:
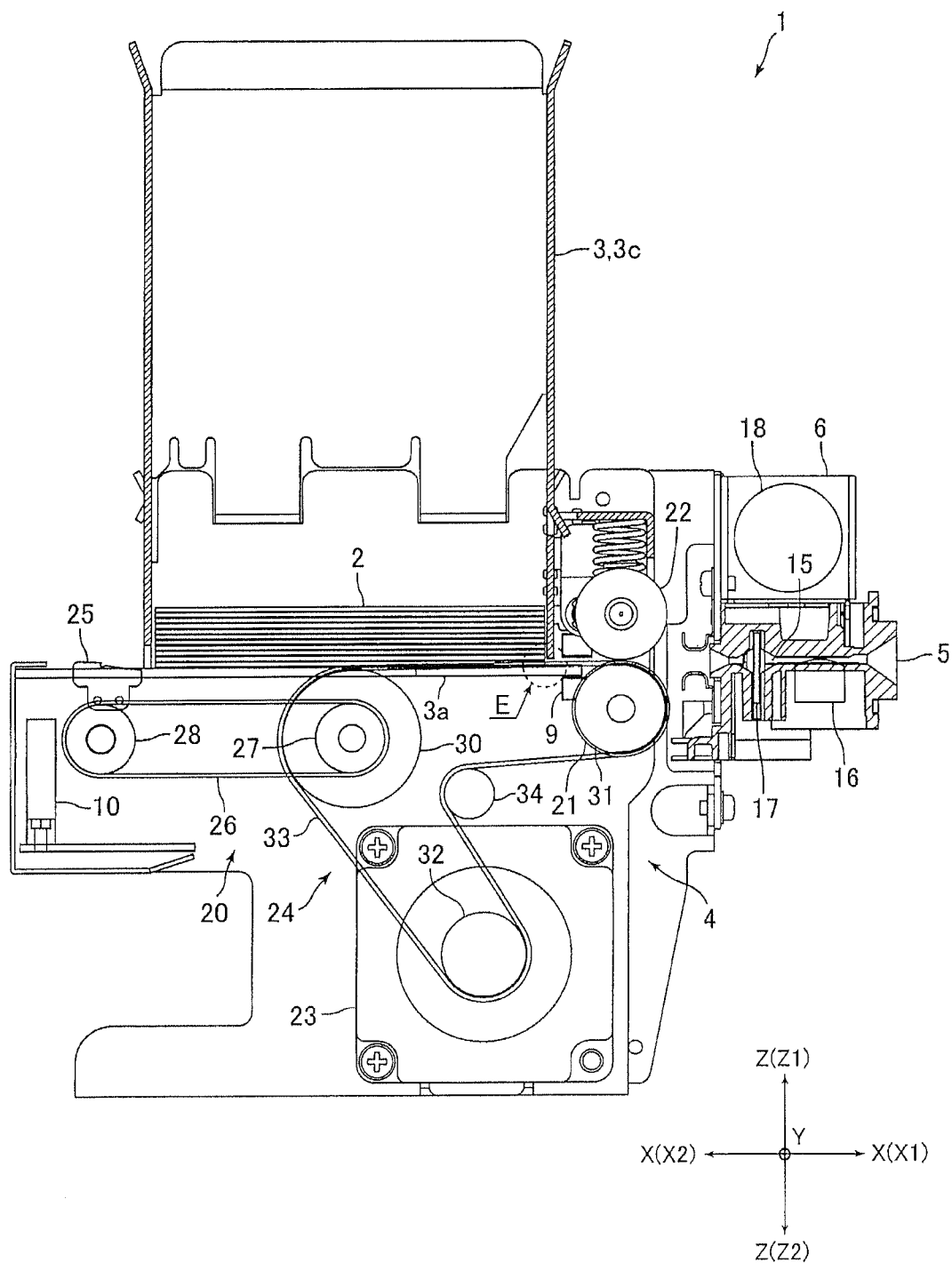
FIG. 1 A diagram of the configuration of a card extracting device of an embodiment of the present invention, explained from the side face.
Figure 2:
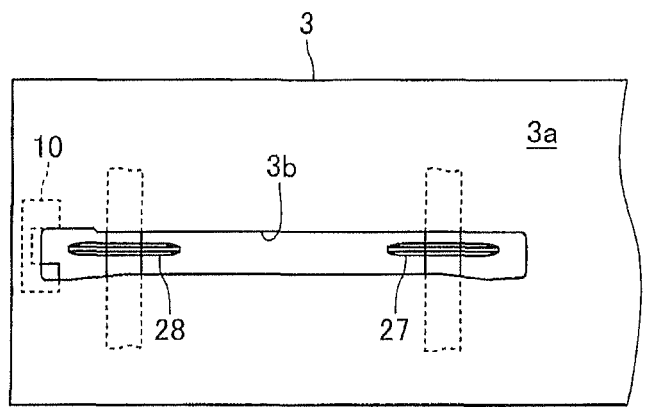
FIG. 2 A plan view of a bottom section of the card storage shown in FIG. 1.
Figure 3:
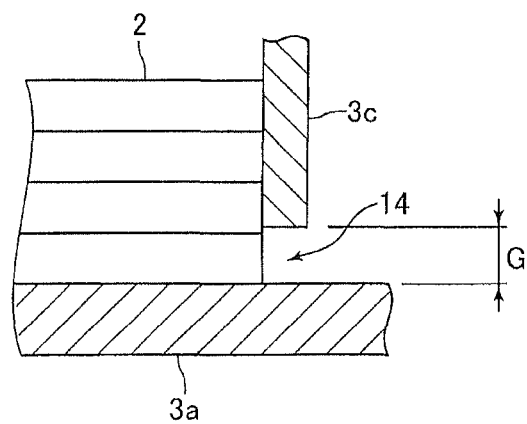
FIG. 3 An enlarged view of E section of FIG. 1.
Figure 4:
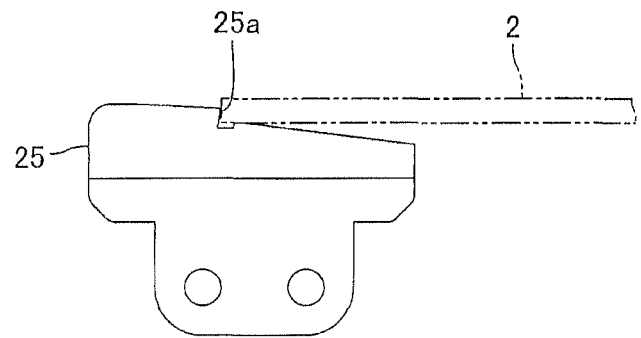
FIG. 4 A side view of an extracting tab shown in FIG. 1.
Figure 5:
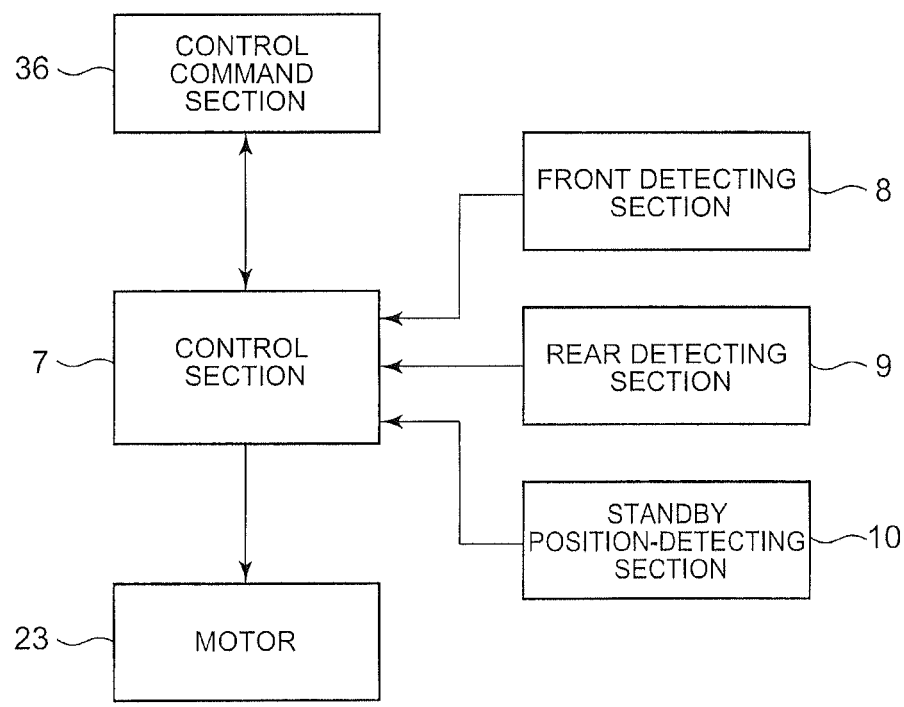
FIG. 5 A block diagram showing the configuration of a control section and its peripheries of the card extracting device shown in FIG. 1.

Embodiments will be described in detail hereinafter referring to the drawings.
Configuration of Card Extracting Device FIG. 1 is a diagram of a card extracting device 1 of an embodiment of the present invention, explaining its configuration from the side. FIG. 2 is a plan view of the bottom section 3a of a card storage 3 shown in FIG. 1. FIG. 3 is an enlarged view of E section of FIG. 1. FIG. 4 is a side view of an extracting tab 25 shown in FIG. 1. FIG. 5 is a block diagram of the configuration of a control section 7 and its peripheries of the card extracting device 1 shown in FIG. 1.

The card extracting device 1 of this embodiment is a device for extracting a card 2 in a predetermined direction. More specifically described, the card extracting device 1 is a card issuing device for issuing a card 2, which is installed in a predetermined host device such as a card issuing system (illustration omitted).

As shown in FIG. 1, the card extracting device 1 comprises a card storage 3 in which a plurality of cards 2 are stacked up, a card extracting mechanism 4 which extracts the cards 2 stored in the card storage 3 to the outside of the card storage 3, and a card discharging section 6 at which a card discharge opening 5 is formed so that the card 2 extracted by the card extracting mechanism 4 is discharged from there. Also, as shown in FIG. 5, the card extracting device 1 further comprises a control section 7 at which various controls for the card extracting device 1 are administered, a front detecting section 8 and a rear detecting section 9 to detect the cards 2, and a standby position-detecting section 10 which detects that an extracting tab, a component of the card extracting mechanism and described later, is in a predetermined standby position.

Note that, in the description below, the three directions that orthogonally intersect with each other are denoted as the X direction, the Y direction and the Z direction; in FIG. 1, the X direction is the "left-right direction", the Y direction is the "front-back direction", and the Z direction is the "top-bottom direction. Also, in the description below, the X1 direction side in FIG. 1 is "the right" side, the X2 direction side is "the left" side, the Z1 direction side is "the top" side and the Z2 direction side is "the bottom" side.

The card storage 3 configures the top portion of the card extracting device 1. The card discharging section 6 configures the right side portion of the card extracting device 1. The card extracting mechanism 4 is arranged bottom left of the card storage 3. In this embodiment, the card 2 is extracted from the card storage 3 to the right. In other words, in this embodiment, the X1 direction is the extracting direction of the card 2. Hereinafter, the right end portion of the card 2 which is a front end portion of the card 2 in the card extracting direction is denoted as "the front end portion" and the left end portion of the card 2 which is a rear end portion of the card 2 in the card extracting direction is denoted as "the rear end portion".

In this embodiment, the card 2 extracted to the card discharging section 6 by the card extracting mechanism 4 is finally taken out from the card extracting device 1 when a user grasps the front end portion of the card 2 and pulls it out.

The card 2 is a rectangular vinyl chloride card having a thickness of about 0.7-0.8 mm, for example. A magnetic stripe (illustration omitted) on which magnetic information is recorded, for example, is formed on a surface of the card 2. In this embodiment, magnetic information is recorded on the card 2 in advance; the magnetic information is read by a magnetic head 16 arranged at the card discharging section 6, which will be described later; when the reading result is sent to a host device from the card extracting device 1, the use of the card 2 is enabled. Note that the card 2 may be a PET (polyethylene terephthalate) card having a thickness of about 0.18 to 0.36 mm or may be a paper card having a predetermined thickness.

The card storage 3 is formed in a cuboid box shape with the top face open. As shown in FIG. 2, a passing hole 3b is formed in a bottom section 3a that configures the bottom face of the card storage 3 so that an extracting tab 25 which is a component of the card extracting mechanism 4 passes through it and this will be described later. As shown in FIG. 3, a gate 14 is formed between the bottom end of a right side wall 3c of the card storage 3 and the bottom section 3a so that the card 2 extracted from the card storage 3 passes through it toward the card discharging section 6 (to the right). As shown in FIG. 3, the gap G of the gate 14 is set such that, while a single card 2 can pass through it, two cards in stack cannot pass through it. Note that, in this embodiment, a portion of the side wall on the front side on paper in FIG. 1 and a portion of the right side wall 3c of the card storage 3 are notched.

Inside the card discharging section 6, a passage 15 is formed for the card 2 to pass. Also, as shown in FIG. 1, the card discharging section 6 is equipped with a magnetic head 16 to read magnetic information recorded on a magnetic stripe on the card 2 and a shutter member 17 to close the passage 15. The magnetic head 16 is arranged under the passage 15. The magnetic head 16 is urged upwardly by an urging member such as a flat spring which is not illustrated. The shutter member 17 is arranged on the left side of the magnetic head 16. A solenoid 18 is connected to the shutter member 17 via a predetermined power-transmitting mechanism.

The card extracting mechanism 4, as shown in FIG. 1, is equipped with a card-transporting mechanism 20 arranged under the bottom face of the card storage 3, an extracting roller 21 arranged between the gate 14 and the card discharging section 6, a pad roller 22 arranged to be opposite to the extracting roller 21, a motor 23 as a driving source which drives the card-transporting mechanism 20 and the extracting roller 21, and a transmitting mechanism 24 which transmits the power of the motor 23 to the card-transporting mechanism 20 and the extracting roller 21. Note that although the motor 23 of this embodiment is a stepping motor, for example, the motor 23 may be a DC motor other than a stepping motor.

The card-transporting mechanism 20 is equipped with the extracting tab 25 which engages with the rear end portion of a card 2 at the bottom among a plurality of cards 2 stored in the card storage 3 to extract them one by one through the gate 14, a chain 26 to which the extracting tab 25 is fixed, and a pair of sprockets 27, 28 over which the chain is looped. In this embodiment, the chain 26 and the sprockets 27, 28 configure a tab-moving mechanism which moves the extracting tab 25. Note that, in FIG. 2, the illustration of the extracting tab 25 and the chain 26 is omitted.

As shown in FIG. 4, an engaging section 25a is formed in the extracting tab 25 for making contact with the rear end portion of the card 2 to extract the card 2. The sprockets 27, 28 are positioned at a predetermined distance in the left-right direction. In this embodiment, the sprocket 27 is positioned on the right side and the sprocket 28 is positioned on the left side.

The extracting roller 21 and the pad roller 22 are arranged so as to make contact with each other in the top-bottom direction. More specifically described, as shown in FIG. 1, the extracting roller 21 is positioned on the bottom side and the pad roller 22 is arranged so as to make contact with the extracting roller 21 from the top side. Also, the pad roller 22 is urged toward the extracting roller 21.

A one-way clutch (illustration omitted) is built into the extracting roller 21 of this embodiment. More specifically described, the built-in one-way clutch transmits power of the motor 23 when the motor 23 is driven forward, and interrupts the transmission of power of the motor 23 to the extracting roller 21 when the motor 23 is driven in reverse, as described later. The one-way clutch of this embodiment is a card transporting-preventing means which prevents the transporting of the card 2 by the extracting roller 21 when the motor 23 is driven in reverse.

The transmitting mechanism 24 is equipped with a driven pulley 30 fixed to the rotation shaft of the sprocket 27 to transmit power to the sprocket 27, a driven pulley 31 fixed to the rotation shaft of the extracting roller 21 to transmit power to the extracting roller 21, a driving pulley 32 fixed to the output shaft of the motor 23, a belt (timing belt) 33 looped over these pulleys, and a tension pulley 34 for adjusting the tension of the belt 33. In this embodiment, the diameter of the driven pulley 31 is smaller than that of the driven pulley 30 so that the speed of delivering the card 2 with the extracting roller 21 is faster than the speed of delivering the card 2 with the extracting tab 25.

The front detecting section 8 is equipped with an abutting lever (no illustration) which abuts on the end portion of the card 2 in the front-back direction and a mechanical sensor (no illustration) configured by a contact lever which follows the movement of the abutting lever and a contact switch. The front detecting section 8 is arranged in the card discharging section 6. Note that although the illustration of the front detecting section 8 is omitted in FIG. 1, the front detecting section 8 is arranged at approximately the same location as the position of the magnetic head 16 in the left-right direction.

In this embodiment, the front detecting section 8 detects whether or not the card 2 is pulled out from the card discharge opening. In other words, the front detecting section 8 detects whether or not the card 2 is discharged from the card discharge opening 5. The front detecting section 8 of this embodiment is a card discharge-detecting means which detects that the card 2 is discharged from the card discharge opening 5.

The rear detecting section 9 is an optical sensor having a light-emitting device and a light-receiving device which are arranged to be opposite to each other in the top-bottom direction. The rear detecting section 9, as shown in FIG. 1, is arranged on the immediate left side of the extracting roller 21 and the pad roller 22. More specifically described, the rear detecting section 9 is arranged such that the card 2 being transported through the gate 14 toward the extracting roller 21 and the pad roller 22 passes between the light-emitting device and the light-receiving device.

In this embodiment, when the rear end portion of the card 2 passes the rear detecting section 9 and then escapes between the extracting roller 21 and the pad roller 22, the extraction of the card 2 is completed. More specifically described, when the motor 3 is driven by a predetermined amount based on the moment when the rear end portion of the card 2 passes the rear detecting section 9, the extraction of the card 2 is completed. The rear detecting section 9 of this embodiment is a card extraction-detecting means which detects the completion of the extraction of the card 2.

The standby position-detecting section 10 is an optical sensor having a light-emitting device and a light-receiving device arranged to be opposite to each other in the front-back direction. The standby position-detecting section 10, as shown in FIG. 1, is arranged on the left side of the sprocket 28. More specifically described, the standby position-detecting section 10 is arranged such that the extracting tab 25 passes between the light-emitting device and the light-receiving device. The standby position-detecting section 10 of this embodiment is a standby position detecting means which detects that the extracting tab 25 prior to the extraction of the card 2 is in the standby position. Also, the standby position detecting section 10 of this embodiment is an extracting tab-detecting means which detects the position of the extracting tab 25.

The control section 7 administrates various controls of the card extracting device 1. In other words, the control section 7 controls the motor 23 as well. As shown in FIG. 5, the front detecting section 8, the rear detecting section 9, the standby position-detecting section 10 and the motor 23 are connected to the control section 7 as the components related to the control of the motor 23. Also, the control section 7 is connected to a control command section 36 of a host device in which the card extracting device 1 is installed. The control section 7 of this embodiment is a control means which controls the motor 23. Note that the control section 7 is configured by a motor driving circuit having a transistor or the like, a memory means such as a ROM or a RAM, a computation means such as a CPU and an input/output means such as an IO port, for example.

Operation of Card Extracting Device

Figure 6:
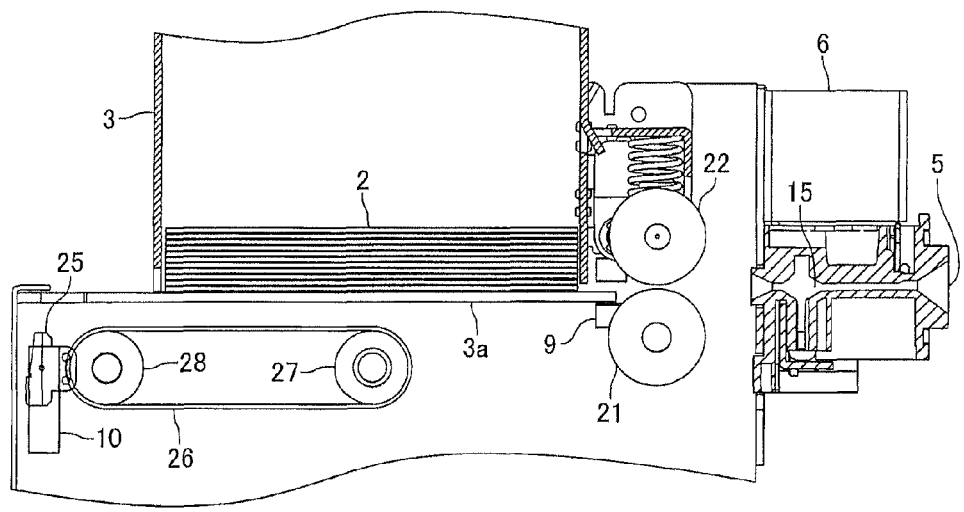
FIG. 6 A diagram showing a stand-by status of the card extracting device of FIG. 1 before extracting a card from the card storage.
Figure 7:
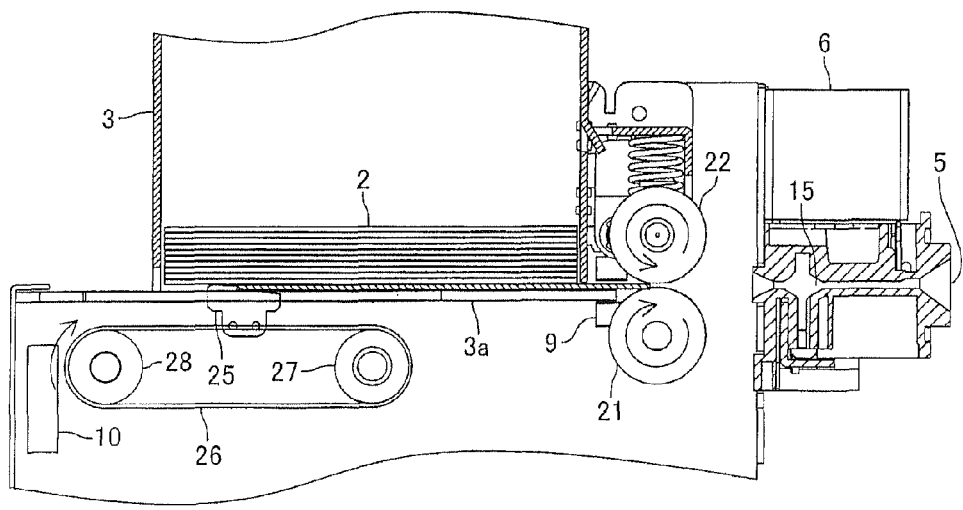
FIG. 7 A diagram showing a status of the card extracting device of FIG. 1 in which a card is being extracted by the extracting tab.
Figure 8:
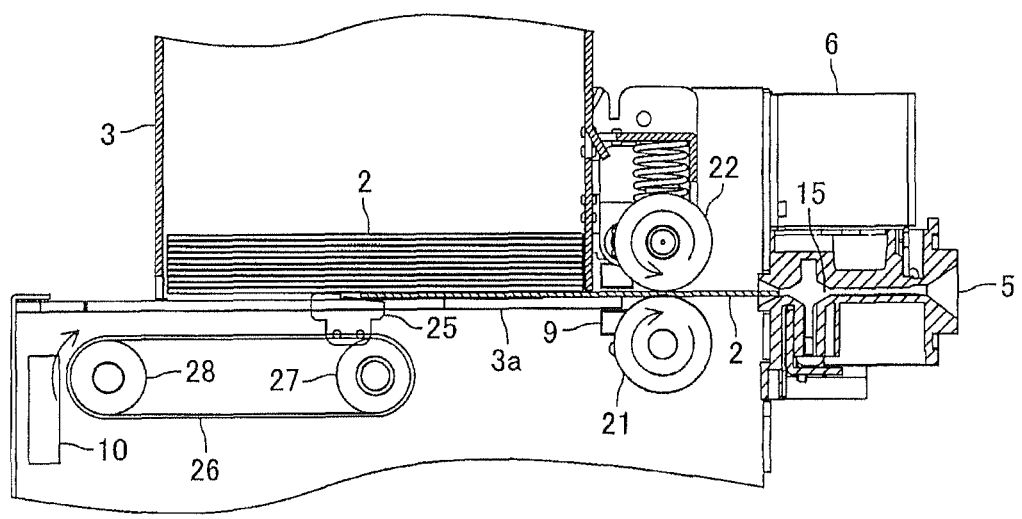
FIG. 8 A diagram showing a status of the card extracting device of FIG. 1 in which a card is being sent out by the extracting roller and a pad roller.
Figure 9:
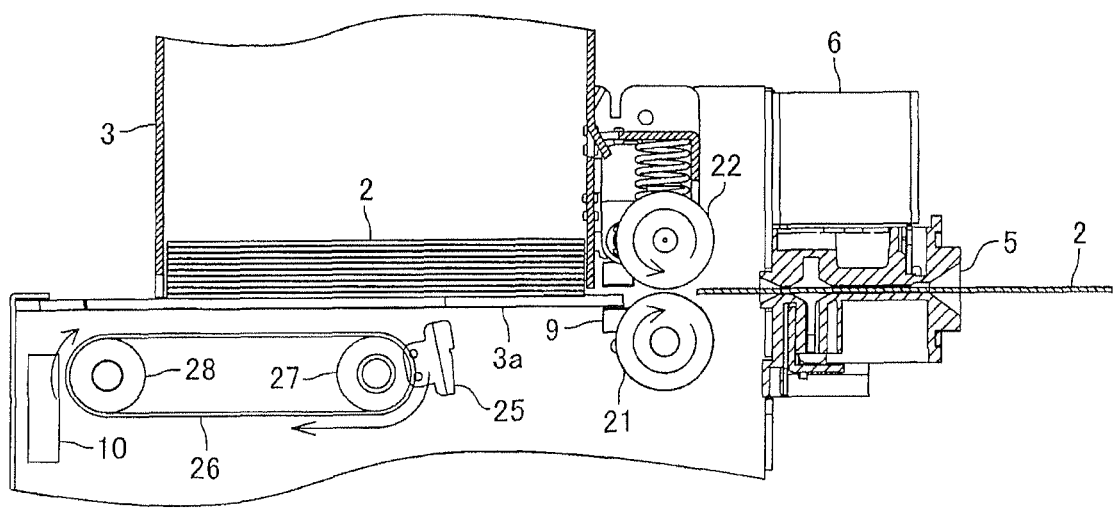
FIG. 9 A diagram showing a status of the card extracting device of FIG. 1 immediately after the extraction of the card is completed, in which the card waits to be pulled out.
Figure 10:
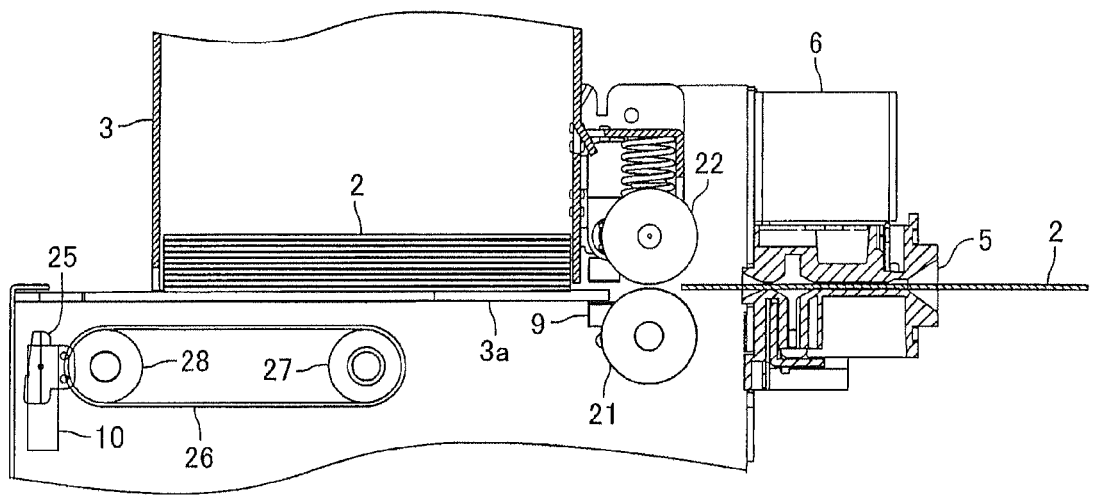
FIG. 10 A diagram showing a status of the card extracting device of FIG. 1 in which the extracting tab has returned to the standby position while the card waits to be pulled out.
Figure 11:
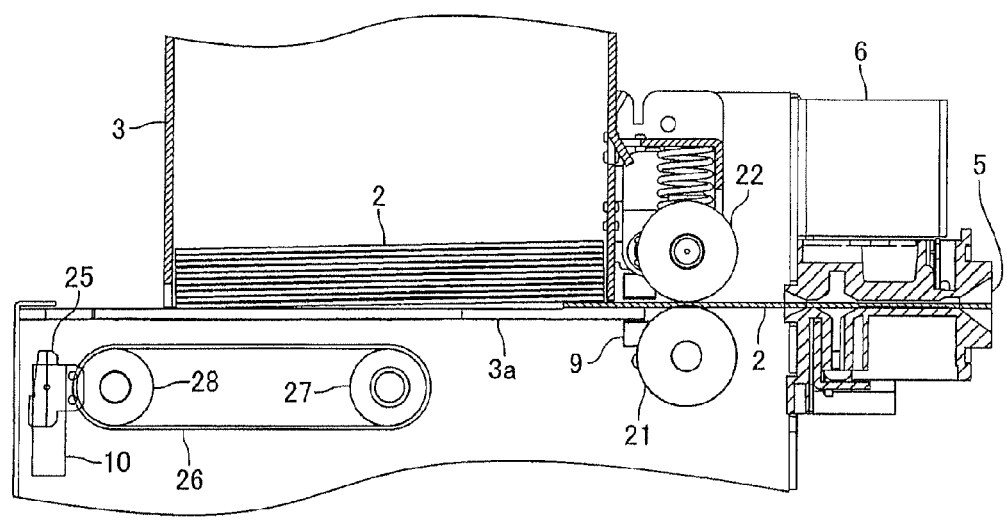
FIG. 11 A diagram showing a status of the card extracting device of FIG. 1 in which the card waiting to be pulled out is pushed back into the card extracting device.
Figure 12:
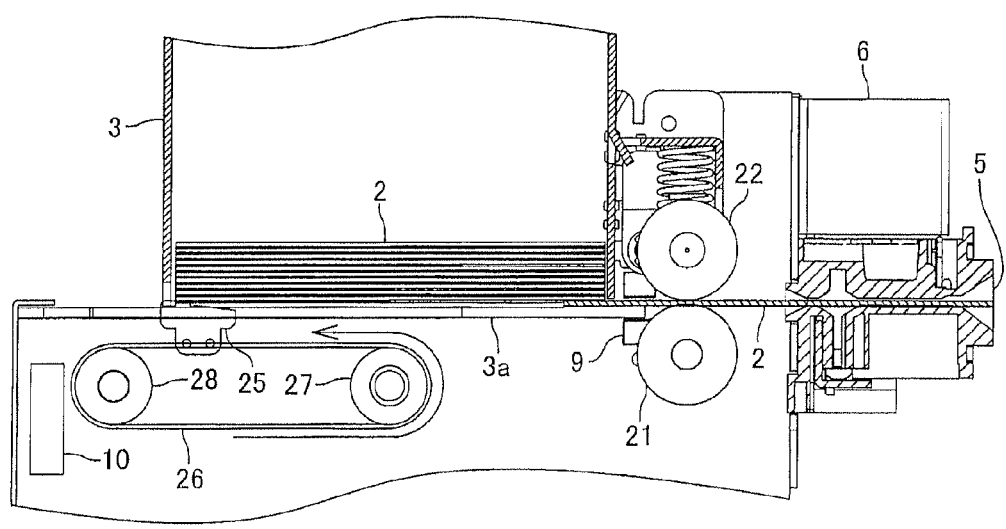
FIG. 12 A diagram showing a status of the card extracting device of FIG. 1 before the card jammed in the card extracting device or the card pushed inside the card extracting device while waiting to be pulled out is re-extracted.

FIG. 6 is a diagram showing the standby status of the card extracting device 1 of FIG. 1 before a card 2 is extracted from the card storage 3. FIG. 7 is a diagram showing the status of the card extracting device 1 of FIG. 1, in which the extracting tab 25 is extracting the card 2. FIG. 8 is a diagram showing the status of the card extracting device 1 of FIG. 1 in which the extracting roller 21 and the pad roller 22 are extracting the card 2. FIG. 9 is a diagram showing the status of the card extracting device 1 of FIG. 1 immediately after the extraction of the card 2 is completed and in which the card 2 waits to be pulled out. FIG. 10 is a diagram showing the status of the card extracting device 1 of FIG. 1, in which the extracting tab 25 is back to the standby position while the card 2 waits to be pulled out. FIG. 11 is a diagram showing the status of the card extracting device of FIG. 1, in which the card 2 waiting to be pulled out is pushed back into the card extracting device 1. FIG. 12 is a diagram showing the status of the card extracting device 1 of FIG. 1 before the card 2 jammed inside the card extracting device 1 or the card 2 pushed back into the card extracting device 1 while waiting to be pulled out is re-extracted.

The operation of the card extracting device 1 configured as above is described hereinafter. Note that in the description below the clockwise rotating direction in FIG. 1 and FIG. 6 through FIG. 12 is defined as "clockwise" and the counterclockwise rotating direction in FIG. 1 and FIG. 6 through FIG. 12 is defined as "counterclockwise".

When the card extracting device 1 is in the stand-by status (i.e. before the card 2 is extracted from the card storage 3), the extracting tab 25 stands by on the left side of the sprocket 28 as shown in FIG. 6. At that time, the standby position-detecting section 10 has detected that the extracting tab 25 is in the standby position. When the motor 23 is rotated clockwise, the sprockets 27, 28 are also rotated clockwise and therefore the extracting roller 21 is rotated clockwise.

The extracting tab 25 which has started moving along with the rotation of the sprockets 27, 28 engages with the rear end portion of a card 2 at the bottom as shown in FIG. 7 and moves through the passing hole 3b from left to right to extract the card 2 through the gate 14. In this embodiment, the card extracting speed of the extracting roller 21 is faster than the card extracting speed of the extracting tab 25; therefore, when the front end portion of the card 2 extracted through the gate 14 by the extracting tab 25 reaches the extracting roller 21, the extracting roller 21 and the pad roller 22 take over and further forward the card 2 toward the card discharging section 6 (see FIG. 8).

In this embodiment, the distance between the center of the extracting roller 21 in the left-right direction and the card discharge opening 5 is shorter than the length of the card 2 (the length in the left-right direction). Therefore, when the rear end portion of the card 2 being forwarded by the extracting roller 21 and the pad roller 22 passes the rear detecting section 9 and the rear end portion of the card 2 escapes between the extracting roller 21 and the pad roller 22, the right end side of the card 2 is exposed to the outside of the card extracting device 1 so that the card 2 can be pulled out by a user as shown in FIG. 9. Thus, when the rear end portion of the card 2 escapes between the extracting roller 21 and the pad roller 22 and the extraction of the card 2 is completed, the device is now in the status waiting for a user to grasp the front end side of the card 2 to pull it out.

Note that in this embodiment the distance between the rear detecting section 9 and the front detecting section 8 in the left-right direction is shorter than the length of the card 2 (in the left-right direction), and before the rear end portion of the card 2 passes the rear detecting section 9, the card 2 is detected by the front detecting section 8. Also, when the card 2 is in the status waiting to be pulled out, the front detecting section 8 detects that a portion of the card 2 is inside the card discharging section 6. Also, in this embodiment, the reduction ratio of the transmitting mechanism 24 is set so that, when the rear end portion of the card 2 escapes between the extracting roller 21 and the pad roller 22, the extracting tab 25 moves downwardly from the bottom face 3a of the card storage 3 as shown in FIG. 9.

Even after the rear end portion of the card 2 escapes between the extracting roller 21 and the pad roller 22, the motor 23 is kept rotating; as shown in FIG. 10, when the extracting tab 25 reaches back to the stand-by position, the motor 23 is halted.

Note that, based on the time when the rear end portion of the card 2 being extracted by the extracting roller 21 and the pad roller 22 passes the rear detecting section 9, the motor 23 may be kept rotating until the rear end portion of the card 2 escapes between the extracting roller 21 and the pad roller 22, and then the motor 23 may be temporarily halted, and after a predetermined time the motor 23 may again be driven to move the extracting tab 25 back to the standby position. Or, based on the time when the rear end portion of the card 2 being extracted by the extracting roller 21 and the pad roller 22 passes the rear detecting section 9, the motor 23 may be kept rotating until the rear end portion of the card 2 escapes between the extracting roller 21 and the pad roller 22, and then the motor 23 may be temporarily halted; when the card waiting to be pulled out is pulled out [by a user], the motor 23 may again be driven to move the extracting tab 25 to the standby position. Or, based on the time when the rear end portion of the card 2 being extracted by the extracting roller 21 and the pad roller 22 passes the rear detecting section 9, the motor 23 may be kept rotating until the rear end portion of the card 2 escapes between the extracting roller 21 and the pad roller 22, and then temporarily halted; for issuing the next card 2, the motor 23 may be driven to move the extracting tab 25 back to the standby position, by which the card extracting device 1 enters the standby status.

Here, as shown in FIG. 11, if the card discharge opening 5 is blocked for a ractical joke and therefore the card 2 slips between the extracting roller 21 and the pad roller 22, causing the card 2 be jammed in the card extracting device 1, or the card 2 waiting to be pulled out is pushed back into the card extracting device 1, it is necessary to re-extract the card 2 to the right with the card extracting mechanism 4. If the motor 23 is rotated clockwise in the attempt of re-extracting the card 2 with the extracting roller 21 and the pad roller 22 in such a situation, there is a risk that the extracting tab 25 may extract the next card 2 stored at the bottom in the card storage 3.

Then, in this embodiment, when there is a risk that the extracting tab 25 may extract the next card 2 stored at the bottom in the card storage 3, the motor 23 is driven counterclockwise as shown in FIG. 12 to rotate the chain counterclockwise so that the extracting tab 25 is moved in the opposite direction from the card 2 extracting direction. More specifically described, the extracting tab 25 is moved in the opposite direction from the card 2 extracting direction so that the engaging section 25a of the extracting tab 25 does not abut on the rear end section of the next card 2 stored at the bottom in the card storage 3. More specifically, the extracting tab 25 is moved in the direction opposite from the card 2 extracting direction by a predetermined amount based on the standby position of the extracting tab 25 at which the extracting tab 25 is detected by the standby position-detecting section 10 so that the engaging section 25a stops slightly at the right side of the rear end portion of the next card 2 stored at the bottom. Also, in this embodiment, the standby position-detecting section 10 is an extracting tab-detecting means to detect the position of the extracting tab 25; therefore, the standby position at which the extracting tab 25 stands by prior to the extraction of a card is a predetermined reference position for the extracting tab 25 at which the extracting tab is detected by the extracting tab-detecting means.

Note that the extracting tab 25 may be moved in the direction opposite from the card 2 extracting direction such that the engaging section 25a stops at the far right from the rear end portion of the next card 2 stored at the bottom, or the extracting tab 25 may be moved in the direction opposite from the card 2 extracting direction such that the extracting tab 25 stops [far] below the bottom face section 3a. In this embodiment, the chain is rotated counterclockwise "to move the extracting tab 25 in the direction opposite from the card 2 extracting direction.

In this embodiment, the distance between the rear detecting section 9 in the left-right direction and the card discharge opening 5 is shorter than the length of the card 2 (in the left-right direction). Therefore, when the card 2 waiting to be pulled out is pushed back into the card extracting device 1, the rear detecting section 9 detects the rear end side of the card 2. Also, in this embodiment, a one-way clutch is built into the extracting roller 21 as described above; therefore, even when the motor 23 is driven counterclockwise, the jammed card 2 or the card 2 pushed back into the device will not be transported to the left by the extracting roller 21 and the pad roller 22.

As described above, in this embodiment, when the motor 23 is driven clockwise, the extracting tab 25 and the extracting roller 21 extract the card 2 from the card storage 3. Hereinafter, the rotation of the motor 23 when the card 2 is extracted (that is, the clockwise rotation of the motor 23) is a forward rotation. On the other hand, the counterclockwise rotation of the motor 23 is a reverse rotation.

Control Method for Card Extracting Device

Figure 13:
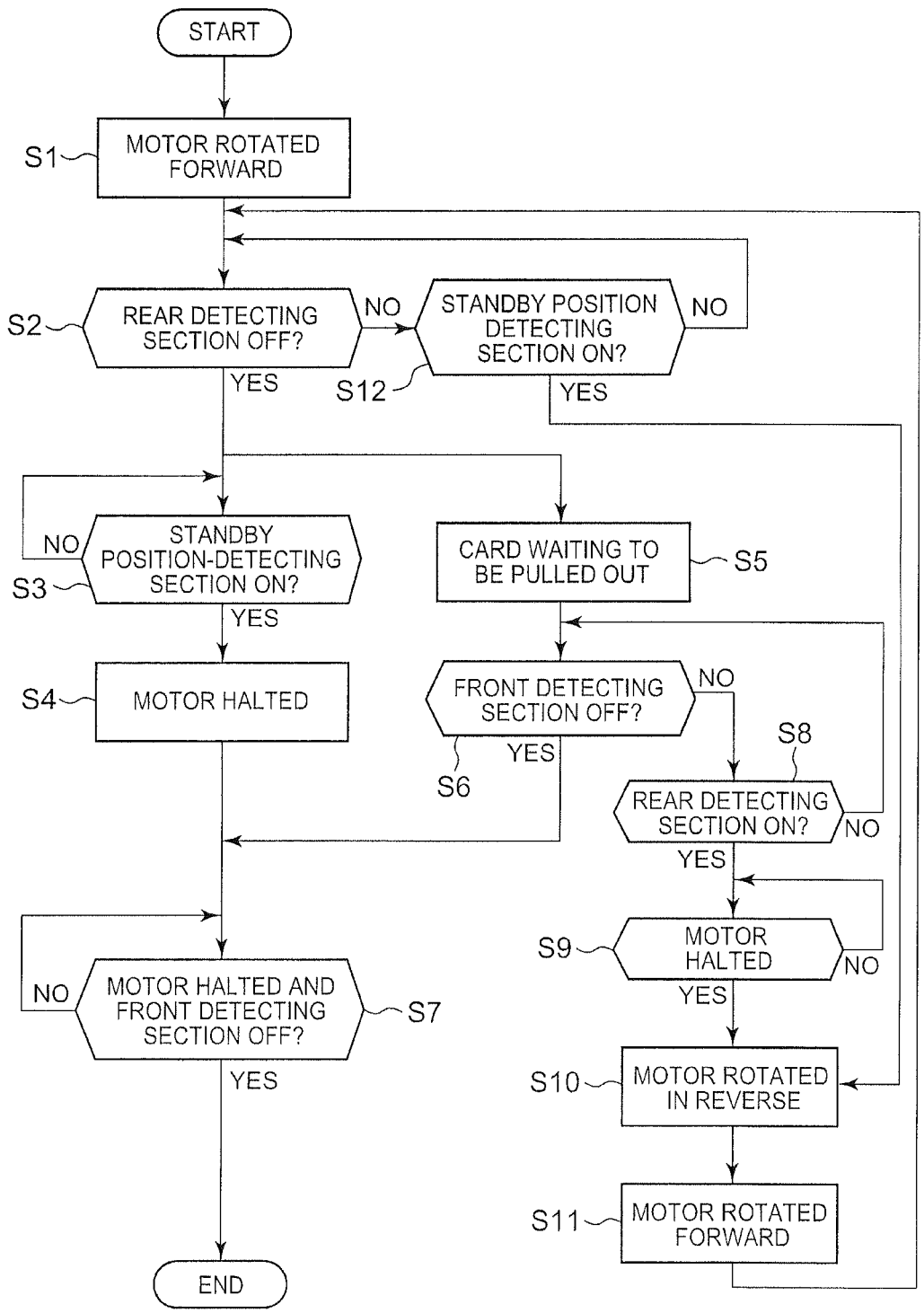
FIG. 13 A flowchart of an example of the control flow of the card extracting device shown in FIG. 1.

FIG. 13 is a flowchart of an example of the control flow of the card extracting device 1 of FIG. 1.

An example of the control flow of the card extracting device 1 is described hereinafter, referring to FIG. 13.

When a card 2 is issued by the card extracting device 1, a command to issue a card 2 is input to the control section 7 from a control command section 36. Then, the control section 7 drives the motor 23 forward to extract a card 2 from the card storage 3 (Step S1). More specifically, a card 2 is first extracted by the extracting tab 25 which has been moved from the standby position, and then the card 2 is further forwarded by the extracting roller 21 and the pad roller 22. In Step S1, the card 2 extracted by the extracting tab 25 is soon detected by the rear detecting section 9 (that is, the rear detecting section 9 is turned ON).

After this, while extracting the card 2, the control section 7 judges whether or not the rear end portion of the card 2 being extracted has passed the rear detecting section 9 and the rear detecting section 9 is turned OFF (Step S2). When the rear detecting section 9 is turned OFF in Step S2, the control section 7 continually drives the motor 23 forward until the standby position-detecting section 10 detects the extracting tab 25 (that is, the standby position detecting section is turned ON). When the standby position-detecting section 10 is turned ON (that is, "YES" in Step S3), the control section 7 halts driving the motor 23 (Step S4).

When, after the rear detecting section 9 is turned off ("YES" in Step S2), the motor is rotated forward by a predetermined amount and the rear end portion of the card 2 escapes between the extracting roller 21 and the pad roller 22, the card 2 enters the status where it waits to be pulled out (Step S5). The front detecting section 8 keeps detecting the card 2 while the card is waiting to be pulled out as described above (that is, the front detecting section 8 is ON); therefore, when the card 2 comes into the status where it waits to be pulled out, the control section 7 judges whether or not the card 2 is pulled out and the front detecting section 8 is turned OFF (Step S6).

When the front detecting section 8 is turned OFF in Step S6 (that is, the card 2 is pulled out) and the motor 23 is halted (that is, "YES" in Step S7), the control section 7 finishes the control of issuing the card 2.

On the other hand, when the front detecting section 8 is not turned OFF in Step S6, the control section 7 judges whether or not the rear detecting section 9 is turned ON again (Step S8). When the rear detecting section 9 is not turned ON in Step S8, the process returns to Step S6.

When the rear detecting section 9 is turned ON in Step S8, the control section 7 judges that the card 2 waiting to be pulled out has been pushed back into the card extracting device 1. Then, the control section 7 judges whether or not the motor 23 is halted (Step S9); when the motor 23 has been halted, the motor is driven in reverse (Step S10). More specifically described, the control section 7 drives the motor 23 in reverse in Step S10 so that the extracting tab 25 is moved in the direction opposite from the card 2 extracting direction until the extracting tab comes to the position at which the engaging section 25a of the extracting tab 25 does not abut on the rear end portion of the next card 2 stored at the bottom in the card storage 3. In other words, in this embodiment, the control section 7 drives the motor 23 in reverse [to move the tab 25] to the position at which the engaging section thereof does not abut on the rear end portion of a card 2 stored in the card storage 3, using the predetermined reference position (the standby position) of the extracting tab 25 at which the extracting tab 25 is detected by the standby position-detecting section 10 as the extracting tab detecting means.

After this, the control section 7 drives the motor 23 forward to re-extracted the card 2 (Step S11), and going back to Step S2, judges whether or not the rear end portion of the card 2 has passed the rear detecting section 9 and the rear detecting section 9 is turned OFF.

When the rear detecting section 9 is not OFF in Step S2, it is judged whether or not the standby position detecting section 10 is ON (Step S12). When the standby position detecting section 10 is not ON in Step S12, the process returns to Step S2. On the other hand, when the standby position detecting section 10 is ON in Step S12, the control section 7 judges that the card 2 is jammed for some reasons and the process proceeds to Step S10 in which the motor 23 is driven in reverse to re-extract the card 2 (Step S11). Note that when the standby position-detecting section 10 is ON in Step S12, that means the motor 23 has been halted.

In this embodiment, Step S1 is a card extracting step in which the motor 23 is driven forward to extract the card 2 to the outside of the card storage 3; Step S10 is an extracting tab-reversing step in which the motor 23 is driven in reverse based on the detection result of the rear detecting section 9 as the card extracting-detecting means to move the extracting tab 25 in the direction opposite from the card 2 extracting direction. Also, Step S11 is a card re-extracting step in which the motor is driven forward after Step S10, which is the extracting tab-reversing step, to re-extract the card 2.

Major Effects of this Embodiment

As described above, in this embodiment, the control section 7 drives the motor 23 in reverse in Step S10 based on the detection result of the rear detecting section 9 in Step S2, the detection result of the front detecting section 8 in Step S6 and the detection result of the rear detecting section 9 in Step S8, or based on the detection result of the rear detecting section 9 in Step S2 and the detection result of the standby position-detecting section 10 in Step S12, so that the chain 26 is rotated in reverse to move the extracting tab 25 in the direction opposite from the card 2 extracting direction. In this embodiment, the motor 23 is driven forward in Step S11 to re-extract the card 2. Therefore, when the rear detecting section 9 or the like detects that the card is jammed or the card 2 waiting to be pulled out has been pushed back into the card extracting device 1, the extracting tab 25 is first moved in the direction opposite from the card 2 extracting direction and then the jammed card or the card pushed back into the device can be re-extracted. Thus, although the extracting tab 25 and the extracting roller 21 are driven by the common motor 23, the extracting tab 25 is kept from passing the standby position and abutting on a card 2 stored in the card storage 3 when the jammed card 2 or the card 2 pushed back into the device is being re-extracted by the extracting roller 21. Consequently, in this embodiment the card 2 pushed back into the card extracting device 1 when waiting to be pulled out or the jammed card 2 can be automatically re-extracted without extracting a card 2 stored in the card storage 3.

In this embodiment, a one-way clutch is built into the extracting roller 21 to transmit power of the motor 23 to the extracting roller 21 and to interrupt the power of the motor 23 transmitted to the extracting roller 21 when the motor 23 is driven in reverse. For this reason, even when the motor 23 is driven in reverse, the card 2 pushed back into the card extracting device 1 while waiting to be pulled out or the jammed card 2 is kept from being transported to the card storage 3 with a relatively simple configuration.

In this embodiment, the control section 7 drives the motor 23 in reverse in Step S10 so that the engaging section 25a of the extracting tab 25 will not abut on the rear end portion of the next card stored at the bottom in the card storage 3. Therefore, even when the motor 23 is driven in reverse to move the extracting tab 25 in the opposite direction from the card 2 extracting direction, the extracting tab 25 is prevented from extracting the next card 2 stored at the bottom in the card storage 3 when the jammed card 2 or the card 2 pushed back into the device needs to be re-extracted.

Particularly in this embodiment, the extracting tab 25 is moved in the opposite direction from the card 2 extracting direction by a predetermined amount based on the standby position of the extracting tab 25 at which the extracting tab 25 is detected by the standby position detecting section 10. For this reason, the reverse rotation of the motor 23 (that is, the moving amount of the extracting tab 25 in the opposite direction from the card 2 extracting direction) is determined based on the standby position of the extracting tab 25. Therefore, the extracting tab 25 can be moved more precisely so that the engaging section 25a of the extracting tab 25 does not abut on the rear end portion of the next card stored at the bottom in the card storage 3. Also, in this embodiment, the standby position-detecting section 10 functions as the extracting tab-detecting means which detects the position of the extracting tab; therefore, the control section 7 drives the motor 23 in reverse until [the tab comes to the position] at which the engaging section thereof does not abut on the rear end portion of a card 2 stored in the card storage 3, based on the predetermined position of the extracting tab 25 at which the extracting tab 25 is detected by the standby position detecting section 10 (extracting tab-detecting means). For this reason, the amount of reverse rotation of the motor 23 can be determined based on the predetermined reference position of the extracting tab 25; therefore, the motor 23 can be driven in reverse more precisely until [the tab comes to the position] at which the engaging section thereof does not abut on the rear end portion of a card 2 stored in the card storage 3.

In this embodiment, the front detecting section 8 is arranged at the card discharging section 6 at which the card discharge opening 5 is formed, to detect that the card 2 has been extracted from the card discharge opening 5. Therefore, the front detecting section 8 is used to appropriately judge whether or not the card 2 is extracted from the card discharge opening 5. Also, the front detecting section 8 and the rear detecting section 9 are used to appropriately judge whether or not the card 2 waiting to be pulled out is pushed back into the card extracting device 1. In other words, in this embodiment it is possible to appropriately judge the status of the card 2 extracted by the extracting roller 21 by using the front detecting section 8.

Other Embodiments

The above-described embodiment is an example of the preferred embodiments of the present invention; however, the present invention is not limited to this, but can be variously modified within the scope of the invention.

Figure 14:
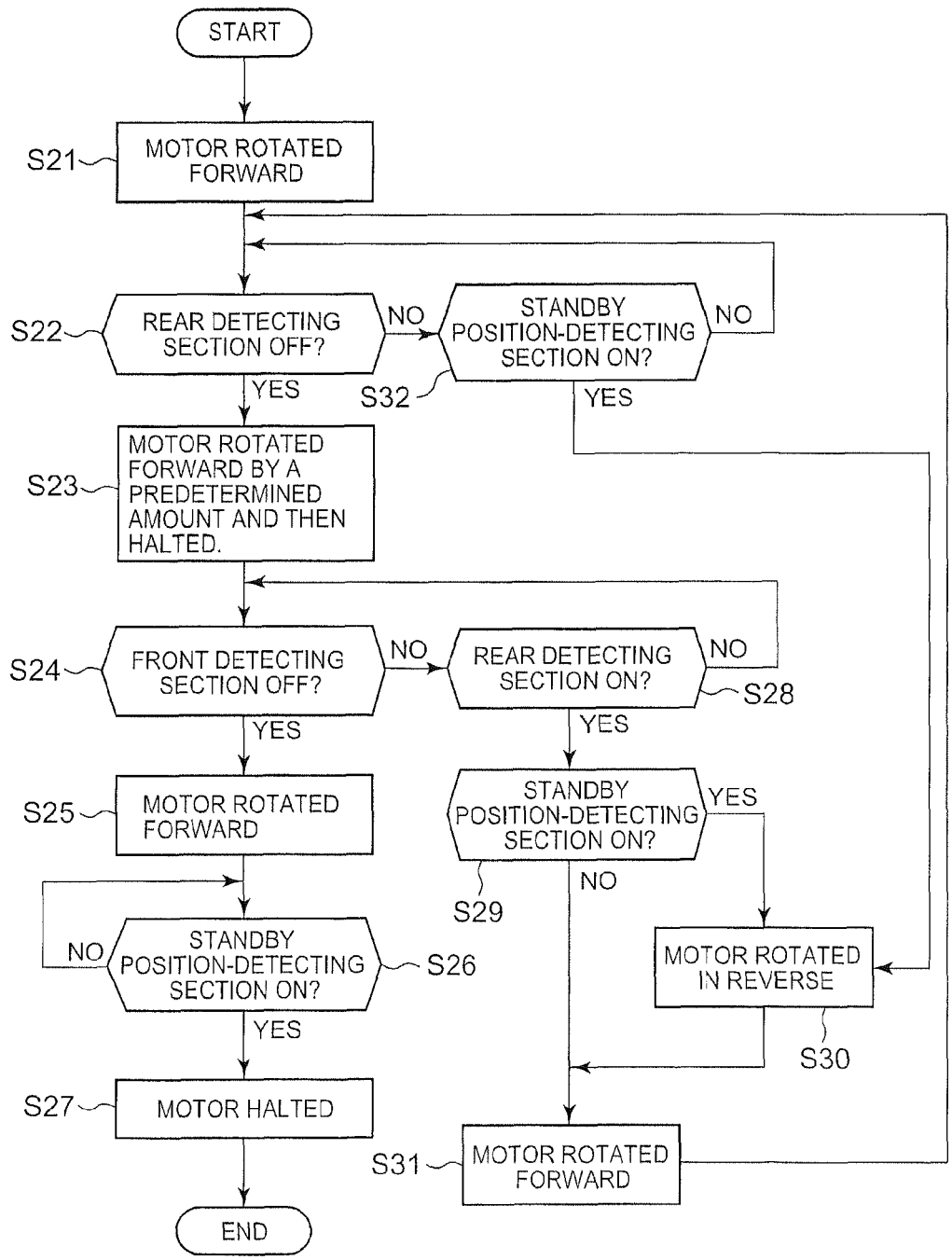
FIG. 14 A flowchart of an example of the control flow of a card extracting device of another embodiment of the present invention.

In the above-described embodiment, an example of the control flow of the card extracting device 1 is described referring to FIG. 13, in which the motor 23 is kept rotating even after the rear end portion of the card 2 escapes between the extracting roller 21 and the pad roller 22 and the motor 23 is halted when the extracting tab 25 reaches back to the standby position; however, FIG. 14 shows another control flow of the card extracting device 1, in which the motor 23 is driven until the rear end portion of the card 2 escapes between the extracting roller 21 and the pad roller 22 based on the time when the rear end portion of the card 2 extracted by the extracting roller 21 and the pad roller 22 passed the rear detecting section 9, then the motor 23 is temporarily halted, and then the motor 23 is again driven to move the extracting tab 25 back to the standby position when the card 2 waiting to be pulled out is pulled out.

In other words, in the same manner as the control flow shown in FIG. 13, the control section 7 first drives the motor 23 forward to extract the card 2 from the card storage 3 (Step S21) and while forwarding the card 2, judges whether or not the rear end section of the extracted card 2 has passed the rear detecting section 9 and the rear detecting section 9 is turned OFF (Step S22). When the rear detecting section 9 is OFF in Step S22, the control section 7 drives the motor 23 forward by a predetermined amount until the rear end portion of the card 2 escapes between the extracting roller 21 and the pad roller 22, and then halts the motor 23 (Step S23).

When the motor 23 is halted in Step S23, the card 2 is now in the status where it waits to be pulled out. While the card 2 is in the status waiting to be pulled out, the front detecting section 8 keeps detecting the card 2; therefore, after this, the control section 7 judges whether or not the card 2 is pulled out and the front detecting section 8 is turned OFF (Step S24).

When the front detecting section 8 is turned OFF in Step S24, the control section 7 drives the motor 23 forward until the extracting tab 25 is detected by the standby position detecting section 10; when the standby position detecting section 10 is turned ON, the motor 23 is halted (Steps S25 through S27). Also, as the control section 7 halts the motor 23 in Step S27, the control of issuing the card 2 is completed.

On the other hand, when the front detecting section 8 is not turned OFF in Step S24, the control section 7 judges whether or not the rear detecting section 9 is turned ON again (Step S28). When the rear detecting section 9 is not ON in Step S28, the process returns to Step S24.

When the rear detecting section 9 is turned ON in Step S28, the control section 7 judges that the card 2 waiting to be pulled out has been pushed back into the card extracting device 1. Then, the control section 7 judges whether or not the standby position detecting section 10 has detected the extracting tab 25 (that is, whether or not the extracting tab 25 is positioned in the standby position and the standby position detecting section 10 is turned ON) (Step S29); when the standby position detecting section 10 has detected the extracting tab 25, the motor is driven in reverse (Step S30). More specifically described, the control section 7 drives the motor 23 in reverse in Step S30 so that the engaging section 25a of the extracting tab 25 does not abut on the rear end portion of the next card 2 stored at the bottom in the card storage 3.

After this, the control 7 drives the motor 23 forward to re-extract the card 2 (Step S31); returning to Step S22, the control section 7 judges whether or not the rear end portion of the card 2 has passed the rear detecting section 9 and the rear detecting section 9 is turned OFF.

On the other hand, when the stand-by position detecting section 10 has not detected the extracting tab 25 in Step S29, there is only a low possibility that the extracting tab 25 passes the stand-by position and abuts on the next card 2 stored at the bottom in the card storage 3 even when the motor 23 is driven forward. Therefore, when the standby position detecting section 10 is OFF in Step S29, the process proceeds to Step S31.

Also, when the rear detecting section 9 is not OFF in Step S22, [the control section 9] judges whether or not the standby position detecting section 10 is ON (Step S32). When the standby position detecting section 10 is not turned ON in Step S32, the process returns to Step S22. On the other hand, when the standby position detecting section 10 is turned ON in Step S32, the control section 7 judges that the card is jammed for some reason and the process proceeds to Step S30, and the motor 23 is driven in reverse to re-extract the card 2 (Step S31).

Referring to the control flow shown in FIG. 14, when the extracting tab 25 is detected by the standby position-detecting section 10 in Step 29, the control section 7 drives the motor 23 in reverse in Step S30 to move the extracting tab 25 in the opposite direction from the card 2 extracting direction. As described above, when the standby position-detecting section 10 has not detected the extracting tab 25 in Step S29, there is only a low possibility that the extracting tab 25 passes the standby position and abuts on the next card 2 stored at the bottom in the card storage 3 even if the motor 23 is driven forward; therefore, having the device configured in this way, the motor 23 keeps being driven forward without moving the extracting tab 25 in the opposite direction from the card 2 extracting direction until the extracting tab 25 reaches back to the standby position so that the jammed card 2 or the card 2 pushed back into the device can be re-extracted by the extracting roller 21. Therefore, the discharging process of the card 2 can be done promptly when a card jam occurs or the card 2 waiting to be pulled out is pushed back into the card extracting device 1.

Note that, in the control flow shown in FIG. 14, Step S21 is a card extracting step, Step S30 is an extracting tab-reversing step and Step S31 is a card re-extracting step. Also, in the control flow shown in FIG. 14, when the standby position-detecting section 10 detects the extracting tab 25 in the standby position, the motor 23 is driven in reverse to move the extracting tab 25 in the opposite direction from the card 2 extracting direction; however, when the extracting tab 25 is detected by a extracting tab-detecting means which may be separately provided below the card storage 3 to detect the position of the extracting tab 25, the motor 23 is driven in reverse to move the extracting tab 25 in the opposite direction from the card 2 extracting direction, based on the position of the extracting tab 25 detected by this extracting tab-detecting means. Also, when the rear detecting section 9 is turned ON in Step S28, whether or not the standby position-detecting section 10 has detected the extracting tab 25 in the standby position, the extracting tab 25 may be moved in the opposite direction from the card 2 extracting direction. In this case, the position of the extracting tab 25 is specified by the number of steps of the motor 23 which is a stepping motor to move the extracting tab 25 in the opposite direction from the cad 2 extracting direction so that the engaging section 25a of the extracting tab 25 does not abut on the rear end portion of the next card 2 stored at the bottom in the card storage 3.

In the above-described embodiment, the card extracting device 1 is equipped with the card discharging section 6; however, the card extracting device 1 may not be equipped with the card discharging section 6. In other words, the card extracting device may be configured in the same manner as the card extracting device disclosed in Japanese Unexamined Patent Application 2008-165402 (Tokkai), for example. Also, the card extracting device 1 may be equipped with the same card processing section as that disclosed in claim 1 of the above-mentioned patent application, in place of the card discharging section 6.

In the above-described embodiment, a one-way clutch is built into the extracting roller 21; when the motor 23 is driven in reverse, the transmission of power from the motor 23 to the extracting roller is interrupted. Beside this, the card extracting device 1 may be equipped with a withdrawing mechanism which withdraws the pad roller 22 to the upper side or which withdraws the extracting roller 21 to the lower side so that either the pad roller 22 or the extracting roller 21 is withdrawn by this withdrawing mechanism when the motor 23 is driven in reverse to prevent the extracting roller 21 and the pad roller 22 from transporting the card 2. In this case, the withdrawing mechanism is a card transporting-preventing means which prevents the extracting roller 21 from transporting the card 2 when the motor 23 is driven in reverse.

In the above-described embodiment, the control section 7 administers a predetermined computation to control the motor 23, based on the detection results of the front detecting section 8, the rear detecting section 9 and the standby position-detecting section 10. Beside this, based on the detection results of the front detecting section 8, the rear detecting section 9 and the stand-by position detecting section 10, the control command section 36 may perform a predetermined computation, and also according to the control command from the control command section 36 based on this computation result, the control section 7 may control the motor 23.

In the above-described embodiment, the tab-moving mechanism to move the extracting tab 25 is configured by the chain 26 to which the extracting tab 25 is fixed and the sprockets 27, 28. Beside this, the tab-moving mechanism may be configured by the belt to which the extracting tab 25 is fixed and the pulleys over which the belt is looped. Also, the tab-moving mechanism may be configured by a wire to which the extracting tab is fixed and a sheave over which the wire is looped.

In the above-described embodiment, the transmitting mechanism 24 is configured by the driven pulleys 30, 31, the driving pulley 32 and the belt 33; however, the transmitting mechanism 24 may be configured by the chain and the sprockets, etc or may be configured by a gear train, etc.

In the above-described embodiment, the card 2 is a magnetic card having a magnetic stripe. Beside this, the card 2 may be a contact-type IC card in which an IC chip is fixed onto the surface thereof or may be a non-contact IC card into which a communication antenna is built. In this case, a processing mechanism having IC contacts which make contact with an IC chip or a processing mechanism having a communication antenna which communicates with an antenna built into the card 2 is arranged to the card discharging section 6.

In the above-described embodiment, the card storage 3 configures the top portion of the card extracting device 1 and the extracting tab 25 and the transmitting mechanism 24 are arranged below the card storage 3. Beside this, the card storage 3 may configure the bottom portion of the card extracting device 1 and the extracting tab 25 and the transmitting mechanism 24 may be arranged above the card storage 3.

Note that, although the card extracting device 1 is equipped with the motor 23 to drive the extracting tab 25 and the extracting roller 21 together in the above-described embodiment, in the case that the card extracting device 1 is used together with a card reader or a printer and the card extracting device 1 extracts the card 2 toward the card reader or the printer, a motor of the card reader or the printer may be used to drive the extracting tab 25 and the extracting roller 21 together. Also, in the above-described embodiment, a predetermined reference position for the extracting tab 25 is the predetermined standby position at which the extracting tab 25 stands by prior to extraction of a card 2; however, the present invention is not limited to this. In other words, a predetermined reference position for the extracting tab 25 can be any position which the extracting tab 25 passes by, other than the standby position; more specifically described referring to FIG. 1, the predetermined reference position for the extracting tab 25 may be set within the range in which the extracting tab 25 does not abut on a card 2 stored in the card storage 3.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card extracting device for use with a plurality of cards, the card extracting device comprising:
    a card storage in which the plurality of cards are stacked;
    a gate through which said plurality of cards pass toward an outside of said card storage;
    an extracting tab structured to engage with said one of said plurality of cards and extract said one of said plurality of cards through said gate;
    a tab-moving mechanism structured to move said extracting tab;
    an extracting roller arranged outside said card storage to further forward said one of said plurality of cards extracted by said extracting tab;
    a motor structured to drive said tab-moving mechanism and said extracting roller together;
    a card extraction-detecting section structured to detect that extraction of said card is completed;
    a control section structured to control said motor; and
    a card transporting-preventing means for preventing said extracting roller from transporting said one of said plurality of cards during reverse rotation of said motor
    wherein an engaging section is formed in said extracting tab to abut on a rear end portion of said one of said plurality of cards in the card extracting direction and to extract said one of said plurality of cards, and said control section is structured to drive said motor forward to extract said one of said plurality of cards to the outside of the said card storage and drive said motor in reverse based on a detection result of said card extraction-detecting section, to move said extracting tab in an opposite direction from the card extracting direction;
    wherein said card transporting-preventing means is a one-way clutch structured to transmit the driving force of said motor to said extracting roller when said motor is driven forward and interrupt the transmitting of the driving force of said motor to said extracting roller when said motor is driven in reverse.

2. A card extracting device for use with a plurality of cards, the card extracting device comprising:
    a card storage in which the plurality of cards are stacked;
    a gate through which said plurality of cards pass toward an outside of said card storage;
    an extracting tab structured to engage with said one of said plurality of cards and extract said one of said plurality of cards through said gate;
    a tab-moving mechanism structured to move said extracting tab;
    an extracting roller arranged outside said card storage to further forward said one of said plurality of cards extracted by said extracting tab;
    a motor structured to drive said tab-moving mechanism and said extracting roller together;
    a card extraction-detecting section structured to detect that extraction of said card is completed;
    a control section structured to control said motor; and
    an extracting tab-detecting section structured to detect a position of said extracting tab;
    wherein an engaging section is formed in said extracting tab to abut on a rear end portion of said one of said plurality of cards in the card extracting direction and to extract said one of said plurality of cards, and said control section is structured to drive said motor forward to extract said one of said plurality of cards to the outside of the said card storage and drive said motor in reverse based on a detection result of said card extraction-detecting section, to move said extracting tab in an opposite direction from the card extracting direction;
    wherein said control section is structured to drive said motor in reverse until said extracting tab comes to a position at which said engaging section does not abut on the rear end portion of said one of said plurality of cards;
    wherein said control section is structured to drive said motor in reverse, based on a predetermined reference position for said extracting tab at which said extracting tab is detected by said extracting tab-detecting section, until said extracting tab comes to the position at which said engaging section does not abut on the rear end portion of said one of said plurality of cards.

* * * * *